United States Patent [19]
Durboraw, III et al.

[11] Patent Number: 5,995,042
[45] Date of Patent: Nov. 30, 1999

[54] SPOOFER DETECTION POWER MANAGEMENT FOR GPS RECEIVERS

[75] Inventors: Isaac Newton Durboraw, III; David Moon Yee, both of Scottsdale; Robert Henry Bickley, Paradise Valley; Philip John Zucarelli, Glendale, all of Ariz.

[73] Assignee: Motorola, Inc., Schaumburg, Ill.

[21] Appl. No.: 08/775,986

[22] Filed: Jan. 2, 1997

[51] Int. Cl.⁶ ..................... G01S 5/01
[52] U.S. Cl. ............... 342/357.02; 342/357.12
[58] Field of Search .......... 342/357.02, 357.06, 342/357.12; 55/343

[56] References Cited

U.S. PATENT DOCUMENTS

| | | |
|---|---|---|
| 4,972,431 | 11/1990 | Keegan ................... 375/200 |
| 5,001,776 | 3/1991 | Clark ...................... 455/343 |
| 5,144,296 | 9/1992 | DeLuca et al. ........... 455/343 |
| 5,448,773 | 9/1995 | McBurney et al. ...... 455/343 |
| 5,557,284 | 9/1996 | Hartman ................. 342/357 |
| 5,564,094 | 10/1996 | Anderson et al. ....... 455/343 |
| 5,592,173 | 1/1997 | Lau et al. ................ 342/357 |
| 5,663,734 | 9/1997 | Krasner ................... 342/357 |

*Primary Examiner*—Gregory C. Issing
*Attorney, Agent, or Firm*—Bradley J. Botsch

[57] ABSTRACT

In a GPS receiver, power is conserved by powering down P-code circuitry during and utilizing C/A code circuits during times when interfering signals, such as spoofing signals, are not detected. When spoofing is detected, the P-code circuitry is powered up so that the GPS receiver can continue to operate in the presence of spoofing.

14 Claims, 2 Drawing Sheets

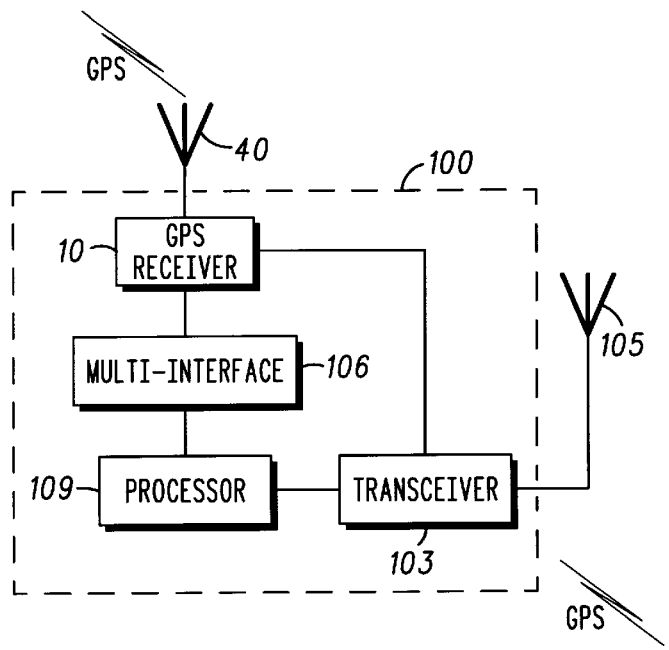
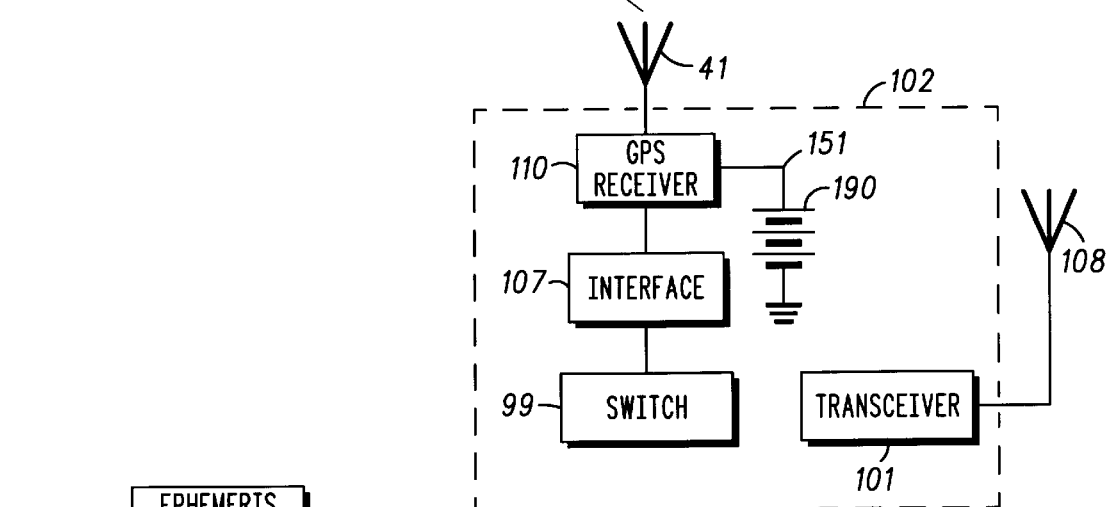
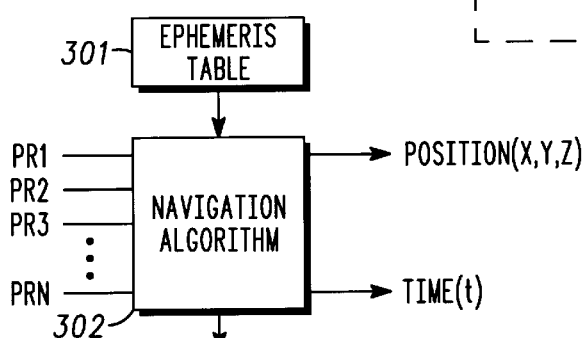
FIG. 1
FIG. 3

SPOOFER DETECTION POWER MANAGEMENT FOR GPS RECEIVERS

BACKGROUND OF THE INVENTION

This invention pertains to Global Positioning System (GPS) radios, in general, and to power conservation in GPS radios in particular.

Power conservation is an important function in various radios. It is particularly important with battery powered radios such as Search and Rescue (SAR) transceivers of the type used in the location and rescue of crews of downed aircraft and in other search and rescue or retrieval activities.

Modern SAR transceivers include a GPS receiver module. The GPS module is used to precisely identify the location of the transceiver and/or to provide precise time of day indications for establishing rendezvous with rescuers. The GPS module automatically determines the location of the transceiver and the SAR transceiver may transmit the location of the transceiver in response to interrogation signals from an interrogation transceiver carried on a rescue vehicle, or may transmit the location information on a periodic basis. Such transceivers may be triggered into operation by an incident switch which is used to sense the occurrence of an event for which the SAR transceiver should be activated. The transceiver may have to operate over an extended period of time before a rescue is possible. It may be many hours, if not days, before a rescue operation may be implemented and successfully completed. Further, in the presence of interfering signals, the GPS receiver may need to implement various and more sophisticated techniques for ascertaining its precise location. Such additional techniques typically consume more power.

Hence, there exists a need for a GPS receiver with SAR capability having the ability to accurately and precisely determine it location, even in the presence of interfering signals, while efficiently managing its overall power cosumption.

BRIEF DESCRIPTION OF THE DRAWING

The invention will be better understood from a reading of the following detailed description of a preferred embodiment of the invention in which like reference designators indicate like elements in the various Figures and in which:

FIG. 1 is a block diagram of a SAR system to which the invention is particularly advantageously applied;

FIG. 3 is a block diagram of a spoofing detector in accordance with the invention.

DETAILED DESCRIPTION

Figure 2:
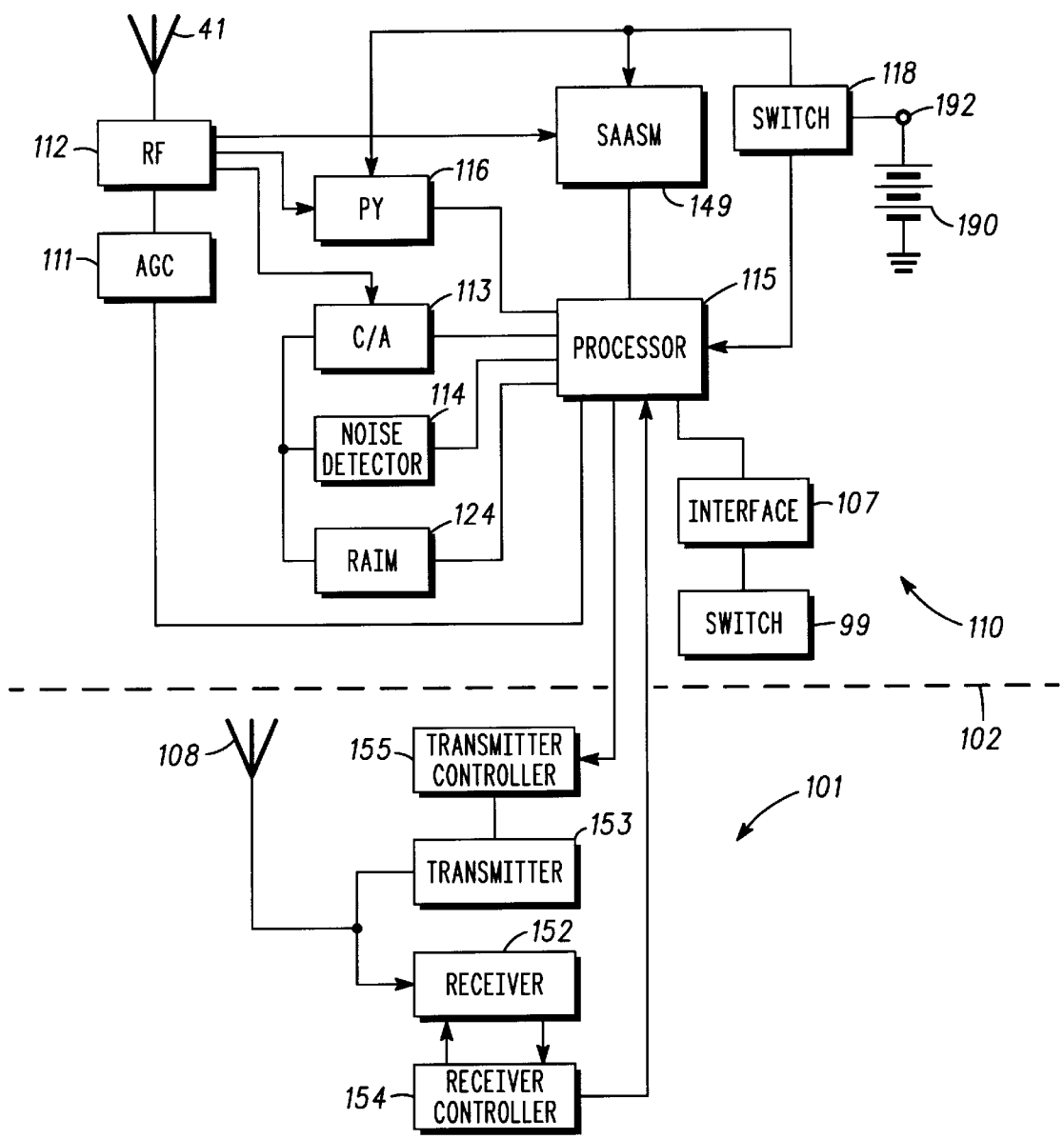
FIG. 2 is a block diagram of a SAR transceiver in accordance with the principles of the invention.

The Global Positioning System (GPS) may be used to determine the position of a GPS receiver on or near the surface of the earth from signals received from a constellation of satellites. The orbits of the GPS satellites are arranged in multiple planes in order that signals can be received from at least four satellites at any position on earth. More typically, signals are received from six or eight satellites at most places on the earth's surface.

Orbits of GPS satellites are determined with accuracy from fixed ground stations and are relayed to the spacecraft. The latitude, longitude and altitude of any point close to the surface of the earth can be calculated from the times of propagation of the electromagnetic signals from four or more of the satellites. A measured range, referred to as a "pseudorange", is determined between the GPS receiver and the satellites based upon these propagation times. The measured range is referred to as pseudorange because there is typically a time offset between timing clocks on the satellites and a clock within the GPS receiver. To determine a three dimensional position, at least four satellite signals are needed to solve for the four unknowns represented by the time offset and the three dimensional position.

The nature of the signals transmitted from the GPS satellites is well known from the literature. Each GPS satellite transmits two spread spectrum, L-band carrier signals, referred to as L1 and L2 signals. Two signals are needed if it is desired to eliminate any error that arises due to refraction of the transmitted signals by the ionosphere. The L1 signal from each GPS satellite is Binary Phase Shift Keyed (BPSK) modulated by two pseudorandom codes in phase quadrature. A pseudorandom code sequence is a series of numbers that are random in the sense that knowledge of which numbers have been already received does not provide assistance in predicting the next received number. Further, using a binary pseudorandom code to modulate the phase of a carrier signal produces a suppressed carrier spread spectrum signal. The L2 signal from each satellite is BPSK modulated by only one of the pseudorandom codes. Use of the pseudorandom codes allows use of a plurality of GPS satellite signals for determining a receiver's position and for providing navigation information. A signal transmitted by a particular GPS satellite is selected by generating and matching, or correlating, the pseudorandom code for that particular satellite. Some of the pseudorandom codes are known and are generated or stored in GPS receivers. Other pseudorandom codes are not publicly known.

A first known pseudorandom code for each GPS satellite is referred to as a "clear acquisition" or C/A code. The C/A code is intended to facilitate rapid satellite signal acquisition and hand over to the P-code and is a relatively short, coarse grained code. The C/A code for any GPS satellite has a relatively short length before it repeats. A second known pseudorandom code for each GPS satellite is referred to as a "precision" or P-code. The P-code is a relatively long, fine grained code. The full P-code has a length of 259 days, with each satellite transmitting a unique portion of the full P-code. The portion of P-code used for a given GPS satellite has a length of precisely one week before the portion repeats.

In GPS receivers, signals corresponding to the known P-code and C/A-code may be generated in the same manner as in the satellites. The L1 and L2 signals from a given satellite are demodulated by aligning the phases, i.e., adjusting the timing of the locally generated codes with those received from the satellites. To achieve phase alignment, the locally generated code replicas are correlated with the received satellite signals until the resultant output signal reaches a peak. Because the time at which each particular bit of the pseudorandom sequence is transmitted from the satellite is defined, the time of receipt of a particular bit can be used as a measure of the range to the satellite. Because the C/A and P-codes are unique to each GPS satellite, a specific satellite may be identified based on the results of the correlations between the received GPS signals and the locally generated C/A and P-code replicas. Methods for generating the C/A code and P-code are set forth in various publicly available publications.

The C/A code component of the L1 signal is provided for commercial use. Various techniques have been developed to replicate the C/A code in GPS receivers. As a consequence of the repetition of the C/A-code approximately once every millisecond, correlation at the GPS receiver may be performed in the absence of precise knowledge of the time of transmission of each C/A code bit. Acquisition of the P-code is generally acquired by first locking on to the C/A-code. Once the C/A-code has been acquired, the C/A-code modulated carrier component of the L1 signal carrier alone may allow for satisfactory measurements. However, when high resolution measurements are desired to be made quickly, the L2 carrier signal must also be used. The unknown atmospheric delay of the L1 and L2 carriers may be eliminated when both of the L1 and L2 carriers are used.

The GPS signals are intended to be recovered by correlating each incoming signal with a locally generated replica of each code, both the P-code and the C/A-code. The result of such correlation is that the carrier in the GPS signals is totally recovered when the modulating signal is the pseudorange code sequence that matches the P-code or the C/A-code. The locally generated code is adjusted in timing to provide an optimum correlation with the incoming signal. The correlation output is then a single narrowband peak centered at the carrier frequency. The carrier recovered by correlation provides the best available signal-to-noise ratio.

Users of GPS systems are particularly concerned about the potential of spoofing. Spoofing is the intentional creation of erroneous GPS-like information signals having carrier characteristics the same as the normal GPS satellite information signals. Spoofing is a form of jamming, but unlike conventional jamming techniques where attempts are made to prevent reception of one radio signal by broadcasting an interfering powerful signal, spoofing attempts to have the receiver of the signals fooled or "spoofed" by erroneous information transmitted over the interfering signal. To prevent jamming signals from being accepted as actual GPS satellite signals, the GPS satellites are provided with an additional secret pseudorandom code referred to as the W-code. The W-code is combined with the known P-code to produce what is referred to as a Y-code when the "anti-spoofing" function is turned on. When the "anti-spoofing" function is turned off, the Y-code is turned off and the known P-code is used. Thus, the secret Y-code can be turned on or off at will by the U.S. Government. The "anti-spoofing" allows the GPS system to be used for the military or other classified United States Government projects.

To defend against spoofing, various techniques have been developed in secure GPS receivers to protect the codes from being duplicated. These techniques have been implemented in special security modules which are referred to as Selective Availability Anti-Spoofing Modules or SAASM. The existence of SAASM is known, but details are not publicly available. The SAASM module generates the PY-code utilizing details which are not publicly available. However, certain details regarding the PY-code are known publicly which has led to the design of equivalent albeit lower accuracy P-code modules. One problem with high security modules such as the SAASM module and other P-code modules is that, due to the extreme signal processing required, they consume significant amounts of power. These modules consume more power than a C/A code module.

In accordance with the principles of the present invention, a GPS receiver includes a spoofing detector circuit which is used to provide a signal which turns power off to the SAASM module during the time that spoofing is not detected. In such circumstances, the C/A-code module is used to provide location and time information.

In order to combat spoofing, the occurrence of spoofing must be detected. One method is to detect an increase in signal levels or to detect higher levels of noise on received signals. A second method of spoofer detection is to detect inconsistencies in the signals received from the satellites when signals from more than four satellites are being received. This second arrangement is based upon the well-known pseudo range measurements that are fundamental to GPS operation. Typically, signals from at least four satellites are needed to make the calculations necessary to determine position. When signals are received from more than four GPS satellites, then more measurements are made than are strictly required to determine position. These additional calculations may be used to determine whether any of the measurements are corrupted. If the measurements are not consistent, then it is apparent that spoofing is occurring. Since a typical GPS receiver can track up to six or eight satellites simultaneously, this approach is well within the scope of available technologies.

FIG. 1 illustrates a SAR transceiver system utilizing GPS receivers. The transceiver system comprises an interrogation unit 100 and an interrogated unit 102. The interrogation unit 100 includes a GPS module 10. GPS module 10 receives signals from GPS antenna 40 which is of conventional design for receiving GPS L-band signals. A computer processing unit 109 is coupled to the GPS module 10 utilizing a communications multi-interface 106 or other conventional data connections. A radio transceiver 103 is coupled to transceiver antenna 105 and to the GPS module 10. Transceiver 103 is used to transmit interrogation signals to the interrogated unit 102 and to receive response signals from the interrogated unit 102. The interrogated unit 102 is associated with personnel to be rescued.

The interrogated unit 102 responds to interrogation signals by transmitting GPS determined positional information identifying the location of the personnel to be rescued. The interrogation unit transceiver 100 may also include appropriate modulation and reception circuits to permit voice communication between the rescuers and the personnel intended to be rescued. The GPS module may be of any conventional GPS receiver design and serves the purpose of permitting the rescuers using the interrogation unit 100 to determine their precise location and to have a precise time source with which to establish rendezvous times with the personnel to be rescued. The interrogation unit 100 may include displays with which the position of the interrogating unit may be precisely determined as well as displaying GPS positional information which is received from the interrogated unit 102. Details of a SAR system interrogation unit 100 are shown and described in U.S. Pat. No. 5,519,403 which is assigned to the same assignee of the present invention. The teachings of the aforementioned patent are incorporated herein by reference.

The interrogated unit 102 includes a GPS module 110 which receives GPS signals from GPS satellites by means of a GPS antenna 41. The interrogated unit 102 includes a transceiver 101, which is coupled to the GPS module 110. An incident switch 99 is coupled through an incident input of an interface 107 to the GPS module 110. The incident switch 99 is used in some SAR applications to automatically trigger the operation of the SAR transceiver. The interrogated unit 102 receives its power from a battery source 190. The battery 190 has power connections 151 to components of the interrogation unit 102 which are capable of being switched on in response to the occurrence of spoofing signals and are capable of being switched off when spoofing signals are not detected. The GPS module 110 responds to the incident switch 99 being activated by causing a radio transceiver 101 to send a signal out via antenna 108 which can be received by the interrogation unit 100 via its radio 103. The interrogation unit 100 can direct transceiver 103 to send requests to transceiver 101 for updated location or position information or other relevant information. The interrogated unit 102 can continue to transmit updated information and/or additional message information to the interrogation unit 100.

Turning now to FIG. 2, the interrogated unit or SAR transceiver 102 is shown in greater detail. The SAR transceiver 102 includes a GPS module or radio 110 and a communications module 101. The communications module 101 includes an antenna 108 which is designed to operate at the frequencies at which SAR radios operate. Module 101 includes a receiver 152 and a transmitter 153. Both the receiver 152 and the transmitter 153 may be of any conventional design. Both receiver 152 and transmitter 153 utilize the same antenna 108. Alternatively, separate antennas may be used by each of the transmitter 153 and the receiver 152 to permit full duplex operation of the radio. The antenna configuration does not form part of the instant invention, and any conventional arrangement of antennas and transmitters and receivers which otherwise are useful in the present application may be used in a radio in accordance with the present invention.

Receiver 152 is connected to a receiver controller 154. The receiver controller 154 functions to control the operation of the receiver and to receive interrogation requests output from the receiver to determine whether to activate the transmitter 153. The transmit controller 155 controls the operation of the transmitter 153 and also provides information to be broadcast by the transmitter. The transmit controller 155 receives GPS position information from the GPS module 110 and provides it to the transmitter 153 for transmitting same in response to a the receive controller 154 indicating a receipt of an interrogation from an interrogating module or depending on the particular operational settings may broadcast the positional information on a continuous or periodic basis. It should be appreciated that continuous broadcasting will consume power from the batteries at a faster rate than responding to interrogations or periodic broadcasting.

The GPS module or radio 110 is of substantially conventional design and includes a GPS antenna 41 which receives signals from a constellation of GPS satellites. The antenna 41 is of conventional design and receives signals in the L-band from GPS satellites. Appropriate RF processing circuitry 112 of conventional design is provided to extract information from the L-band signals. The output of the RF circuitry 112 is coupled to a C/A-code module 113. The C/A module 113 utilizes a general correlation function to detect the C/A code whereby the output of the correlator is used to generate the pseudorange to each of the satellites for which a signal has been received.

Correlation techniques are well known and C/A correlation techniques are widely used. With C/A correlation, a correctly received signal is indicated by a single peak output signal of the correlator. In the presence of noise, the output will be multiple peaks. These multiple peaks may be used to determine whether or not the noise is excessive or not. If the noise is excessive, it may be caused by a noise jammer or it may be caused by a weak signal whereby jamming is confirmed if the AGC has also reduced the receiver gain.

C/A-code module 113 has its output coupled to a wide band noise detector 114 which may be a correlator of conventional design as used in GPS receivers. The GPS radio 110 also includes a Receiver Autonomous Integrity Monitor (RAIM) module 124. The RAIM module 124 utilizes a technique that enables a GPS receiver to detect a malfunctioning or out-of-tolerance satellite. The RAIM module 124 computes locations using different combinations of GPS signals from six or more satellites to isolate which GPS signal is flawed. Although the RAIM technique was developed to identify flawed satellite signals, it also is effective to detect spoofing. The technique is well-known and various RAIM modules are utilized in commercial GPS modules.

The output of the noise detector 114 and RAIM 124 are provided to a GPS processor 115. The GPS processor 115 may likewise be of conventional design and may be programmed to provide any conventional GPS functions provided by GPS processors. Also connected to receive the output of the RF circuitry is a PY-code module 116 or a SAASM module, which may be of conventional design. The PY-code module, or the SAASM module 149, provides for detection of the PY-code and operates as a correlation circuit in a manner similar to that of the C/A-module 113.

In certain applications of GPS such as in hand-held GPS receivers, the GPS radio is operated from a source of limited power capabilities such as a battery power source. In such applications, it is highly desirable to conserve power to extend the life of the batteries such that the radio utilizing the GPS radio can be operational for as long a period of time as possible to provide as much time as possible for rescue operations to locate the GPS radio. In a GPS radio in accordance with the principles of the invention, power management is provided to extend the period of time during which the radio may be operated by a battery. Power management is provided by determining whether it is necessary to utilize the PY-code and accordingly the SAASM module 149 when interfering signals and/or spoofing is detected.

Detection of a condition that requires the use of SAASM and the P/Y code is based upon an interpretation of a combination of three independent detectable events. These events are listed as follows and included on the top row of the decision table as shown in Table 1 below.

1. An abnormal setting of the receiver AGC. If the receiver gain value is reduced to an abnormally low setting in response to the AGC detection, then the possibility exists that the reciever is being jammed.
2. RAIM indicated inconsistency in the pseudorange measurements. An indication of a spoofer exists in the event that pseudorange residual levels exceed a threshold level.
3. Detected noise in the reciever will manifest itself in the reciever as "multiple peaks in the correlation function" or as the absence of a clearly defined single synchronized correlatin peak.

|  |  | DETECTABLE EVENT | | |
|---|---|---|---|---|
|  |  | AGC SETTING | RAIM | DETECTED NOISE |
| Receiver Interference Factors | NOISE JAMMING | 1 | 0 | 1 |
|  | WEAK SIGNAL | 0 | 0 | 1 |
|  | SPOOFING (with GPS like signal level) | 0 | 1 | 0 |

| | | | |
|---|---|---|---|
| SPOOFING (with stronger than GPS signal) | 1 | 1 | 0 |

In the decision table, it may be noted that spoofing may be discriminated from other situations by observing the combination of these detectable events. Whenever RAIM indicates inconsistency (a "1"), the system is most likely being spoofed. Further, even if the jammer is significantly stronger that the GPS signal, RAIM is likely to be a valid discriminator between the spoofed case and the non-spoofed case.

As shown in FIG. 2, battery 190 is included as the power source for the GPS radio 102. The battery 190 has a direct connection to the various circuits of the GPS radio 102. The direct connections are not shown in the drawing figure for purposes of clarity. A power terminal 192 is connected to the battery 190. A controllable power switch 118 couples the terminal 192 to selected circuits of the GPS radio 102. The selected circuits include either the above described PY-code module 116 or the SAASM module 149. A control input to the power switch 118 is connected to the processor 115. In accordance with the present invention, when spoofing signals are not detected, the processor 115 will cause the switch 192 to be in one state such that power is not applied to the PY-code module 116 or to the SAASM module 149, which ever is used in the circuit. However, when spoofing signals are detected, processor 115 causes switch 192 to switch to another state such that power is supplied to either the PY-code module 116 or to the SAASM module 149. The power switch 118 may be any of a number of commercially available electronic power switches. Thus, in the absence of spoofing or interference signals, the GPS radio utilizes the C/A-code module 113 to determine the location of the GPS radio 102 from GPS signals and the high security code modules, 116 and 149, are not utilized thereby conserving battery power. In the presence of spoofing signals, the high security module 116 (or 149) is powered up.

Turning now to FIG. 3, one arrangement for the detection of a spoofing signal is shown in block form. In this arrangement, the spoofer is detected via measurement of inconsistencies of the pseudorandom measurements. A navigation algorithm 302 such as a least squares algorithm is used to process input measurements of pseudorange PR1, PR2, PR3, PR4, PR5, PR6 . . . PRN from GPS signal correlators in conjunction with data from an Ephemeris table 301. When more than four pseudorange measurements are available, i.e., signals are captured from more than four GPS satellites, there will generally be a least squares solution of the three positional variables x, y, and z and a variable for time t. For that least squares solution, the residuals are formed as the difference between the input pseudorange measurements and an "estimated pseudorange"

$$\hat{PR}_j (j = 1...n).$$

Detection of a spoofing signal is based upon the absolute magnitude of the least squares residuals being beyond a predetermined threshold. The technique of FIG. 3 may be implemented in the noise detector 114 of FIG. 2.

Thus, a GPS system has been described which provides for extended battery operation of a GPS radio while still providing for anti-spoof protection when the presence of spoofing signals are detected thereby accomplishing certain advantages relative to prior GPS radios. The power savings improvement is substantial and is suitable for various military and civilian applications of GPS radios. While the invention has been described in conjunction with a specific embodiment, many alternatives, modifications and variations will be apparent to those skilled in the art in light of the forgoing description without departing from the spirit or scope of the invention. Accordingly, the invention is intended to embrace all such alternatives, modifications and variations as fall within the spirit and scope of the invention.

What is claimed is:

1. A method for conserving power in a radio comprising a GPS receiver for receiving GPS signals, a C/A-code module for detecting first positional information and a P-code module for detecting second positional information, comprising the steps of:

providing power to said C/A module whereby said C/A module provides positional information from said GPS signals;

detecting the occurrence of interference signals;

providing power to said P-code module when said interference signals are detected; and removing power from said P-code module when interference signals are not detected.

2. A method in accordance with claim 1, wherein:
said interference signals are spoofing signals.

3. A method in accordance with claim 2, wherein:
said radio is a SAR radio.

4. A method in accordance with claim 1, wherein said GPS receiver includes a SAASM, and said method comprises:

powering said SAASM module when said interference detector detects said interfering signals; and removing power from said SAASM when interfering signals are not detected.

5. A GPS radio, comprising:

a battery;

an antenna;

first circuitry coupled to said antenna for receiving GPS signals and for determining the positional location of said antenna to a first degree of accuracy;

second circuitry coupled to said antenna for receiving said GPS signals and for determining the positional location of said antenna to a second higher degree of accuracy;

interference detecting circuitry having an output for indicating the detection of undesired GPS type signals interfering with said GPS signals; and switchable power connections coupled between said battery and said second circuitry and operable in response to said detecting circuitry to establish battery connections to said second circuitry when said interfering signals are detected.

6. A GPS radio in accordance with claim 5, wherein:
said interference detecting circuitry comprises a spoofing detector; and said undesired GPS type signals are spoofing signals.

7. A GPS radio in accordance with claim 5, wherein:
said first circuitry comprises circuitry for detecting first pseudorandom codes; and said second circuitry comprises circuitry for detecting second pseudorandom codes.

8. A GPS radio in accordance with claim 7, wherein:
said first pseudorandom codes comprise C/A codes.

9. A GPS radio in accordance with claim 8, wherein:
said second pseudorandom codes comprise P codes.

10. A GPS radio in accordance with claim 7, wherein:
said first pseudorandom code comprises W codes.

11. A GPS radio in accordance with claim 6, wherein:
said spoofing detector comprises a noise level detector.

12. A GPS radio in accordance with claim 6, comprising:
means responsive to and external stimulus for automatically transmitting the location of said GPS radio as determined by said first or said second circuitry.

13. A GPS radio, comprising:

a power terminal;

an antenna;

first circuitry coupled to said power terminal and coupled to said antenna for receiving GPS signals and for determining the positional location of said antenna to a first degree of accuracy;

second circuitry coupled to said power terminal and coupled to said antenna for receiving said GPS signals and for determining the positional location of said antenna to a degree of accuracy more precise than said first degree of accuracy;

interference detecting circuitry coupled to said power terminal and operable to provide an output indicating the presence of undesired GPS type signals; and controllable switch means coupled between said power terminal and said second circuitry and operable in response to said interference detecting circuiting output to connect said power terminal to said second circuitry when said undesired GPS type signals are present and for disconnecting said power terminal from said circuitry when said undesired GPS type signals are not present.

14. A GPS radio in accordance with claim 13, wherein:
said undesired GPS type signals are spoofing signals.

* * * * *